US009807357B2

(12) United States Patent
Miyashita (10) Patent No.: US 9,807,357 B2
(45) Date of Patent: Oct. 31, 2017

(54) ELECTRO-OPTIC MODULE AND ELECTRONIC APPARATUS

(71) Applicant: Seiko Epson Corporation, Tokyo (JP)

(72) Inventor: Tomoaki Miyashita, Shimosuwa-machi (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/085,641

(22) Filed: Mar. 30, 2016

(65) Prior Publication Data

US 2016/0291400 A1    Oct. 6, 2016

(30) Foreign Application Priority Data

Apr. 6, 2015  (JP) .................................. 2015-077456

(51) Int. Cl.
*H04N 9/31* (2006.01)
*G03B 21/14* (2006.01)
*G03B 21/00* (2006.01)

(52) U.S. Cl.
CPC ......... *H04N 9/3167* (2013.01); *G03B 21/145* (2013.01); *H04N 9/3105* (2013.01); *H04N 9/3141* (2013.01); *H04N 9/3155* (2013.01); *G03B 21/006* (2013.01)

(58) Field of Classification Search
CPC .. G03B 21/005; G03B 21/006; G03B 21/145; G03B 21/208; G03B 21/2066; G03B 21/2073; H04N 9/3132; H04N 9/3141; H04N 9/3167
See application file for complete search history.

(56) References Cited

U.S. PATENT DOCUMENTS

| | | | |
|---|---|---|---|
| 2005/0146689 A1* | 7/2005 | Iechika ................ | H04N 9/3105 353/97 |
| 2005/0200813 A1* | 9/2005 | Kitabayashi ...... | G02F 1/133385 353/20 |
| 2009/0080154 A1* | 3/2009 | Hirabayashi ........ | G02F 1/13452 361/690 |
| 2013/0286360 A1* | 10/2013 | Kawamura ............ | G02B 27/48 353/33 |
| 2015/0160542 A1* | 6/2015 | Tomiyama ......... | G03B 21/2033 353/31 |

FOREIGN PATENT DOCUMENTS

JP    10-133180 A    5/1998

* cited by examiner

*Primary Examiner* — Sultan Chowdhury
(74) *Attorney, Agent, or Firm* — ALG Intellectual Property, LLC (57) ABSTRACT

An electro-optic module includes an electro-optic panel to which an emission side light transmitting plate is fixed, a first frame which holds side surfaces of the electro-optic panel, and a second frame which is fixed to at least one of the electro-optic panel, the emission side light transmitting plate and the first frame on the image light emission side of the first frame. The second frame is provided with a frame-like emission side partitioning member that covers the emission side light transmitting plate from the opposite side of the electro-optic panel and holds an optical element such as an emission side polarizing plate or an emission side phase difference plate.

18 Claims, 7 Drawing Sheets

ELECTRO-OPTIC MODULE AND ELECTRONIC APPARATUS

BACKGROUND

1. Technical Field

The present invention relates to an electro-optic module which is used in an electronic apparatus such as a projection type display apparatus and an electronic apparatus which includes the electro-optic module.

2. Related Art

When an image is displayed in an electronic apparatus such as a projection type display apparatus, light which is modulated by an electro-optic panel is used. The electro-optic panel includes, for example, a first substrate, a second translucent substrate which is arranged to face the first substrate on an emission side, and an electro-optic layer, such as a liquid crystal layer or the like, which is provided between the first substrate and the second substrate, in which an emission side light transmitting plate for dustproofing is fixed to an emission side surface of the second substrate. The electro-optic panel having such a configuration is used in a state in which the electro-optic panel and a frame-like frame provided with side walls, which hold the electro-optic panel, form an electro-optic module.

In addition, a configuration in which an emission side phase difference plate or a polarizing plate is laminated on the emission side of the emission side light transmitting plate and an emission side partitioning member which covers a portion protruding from the emission side light transmitting plate of the electro-optic panel on the image light emission side is provided as the frame is suggested (refer to JP-A-10-133180). The frame is fixed to the plate by screws in the electro-optic module disclosed in JP-A-10-133180, and the electro-optic module is mounted on an electronic apparatus through the plate.

However, like the configuration disclosed in JP-A-10-133180, in a configuration in which a portion protruding from an emission side light transmitting plate of an electro-optic panel is covered with an emission side partitioning member from the image light emission side, there is a concern of light leaking out from the side surfaces of the emission side light transmitting plate. The light leakage becomes stray light, which deteriorates image quality. Thus, this configuration is not preferable.

SUMMARY

An advantage of some aspects of the invention is to provide an electro-optic module in which light leaking out from side surfaces of an emission side light transmitting plate can be prevented from being emitted as stray light and an optical element such as a polarizing plate can be easily arranged at a predetermined position with respect to an electro-optic panel, and an electronic apparatus which includes the electro-optic module.

According to an aspect of the invention, there is provided an electro-optic module including an electro-optic panel, an emission side light transmitting plate which is fixed to an image light emission side surface of the electro-optic panel, a first frame which holds side surfaces of the electro-optic panel, a second frame which includes a frame-like emission side partitioning member that covers the emission side light transmitting plate from the opposite side of the electro-optic panel and is fixed to at least one of the electro-optic panel, the emission side light transmitting plate, and the first frame on the image light emission side of the first frame, and an optical element which is held in the second frame.

In the aspect of the invention, the emission side partitioning member covers the emission side light transmitting plate from the image light emission side and the emission side partitioning member is provided in the second frame that is provided on the image light emission side of the first frame. Therefore, light leaking out from the side surfaces of the emission side light transmitting plate is shielded in the second frame and thus the light can be prevented from being emitted as stray light. Accordingly, it is possible to prevent the light leaking out from the side surfaces of the emission side light transmitting plate from becoming stray light and deteriorating image quality. In addition, since the second frame, in which the emission side partitioning member is provided, is provided separately from the first frame which holds the side surfaces of the electro-optic panel, unlike the case in which the emission side partitioning member is provided in an integrated frame, when the electro-optic module is assembled, the electro-optic panel can be arranged at the inner side of the frame (inner side of the second frame) from the emission side. Further, since the optical element is held by using the second frame, the optical element can be easily arranged at a predetermined position with respect to the electro-optic panel.

In the aspect of the invention, at least one of an emission side polarizing plate and an emission side phase difference plate may be held in the second frame as the optical element.

In the aspect of the invention, it is preferable that the second frame includes a frame-like fixing member which is fixed to at least one of the electro-optic panel, the emission side light transmitting plate and the first frame, and the emission side partitioning member is integrated with the fixing member. According to the configuration, the emission side partitioning member is not required to be provided separately.

In the aspect of the invention, the second frame may include a frame-like fixing member which is fixed to at least one of the electro-optic panel, the emission side light transmitting plate and the first frame, and a partitioning member that is formed separately from the fixing member and protrudes inwardly from the fixing member in a state of being fixed to the fixing member to form an emission side partitioning member.

In the aspect of the invention, it is preferable that the fixing member includes a frame-like plate portion which is fixed to at least one of the electro-optic panel, the emission side light transmitting plate and the first frame, and a cylindrical body portion which protrudes from the plate portion toward the opposite side of the first frame, and the optical element is held in the body portion. According to the configuration, the optical element can be provided at a predetermined position separated from the emission side light transmitting plate.

In the aspect of the invention, it is preferable that both the emission side polarizing plate and the emission side phase difference plate are held in the body portion as the optical element. According to the configuration, the optical element and the emission side phase difference plate can be arranged at predetermined positions separated from the emission side light transmitting plate.

In the aspect of the invention, the emission side phase difference plate may be held at an end portion of the body portion on the opposite side of the plate portion, and the emission side polarizing plate may be fixed to a surface of the emission side phase difference plate on the opposite side of the emission side light transmitting plate. According to the configuration, the emission side polarizing plate and the emission side phase difference plate can be arranged at predetermined positions separated from the emission side light transmitting plate.

In this case, the fixing member may be fixed to the surface of the emission side light transmitting plate on the opposite side of the electro-optic panel in a state in which the fixing member is separated from the electro-optic panel and the first frame.

In the aspect of the invention, the emission side polarizing plate may be held in an end portion of the body portion on the opposite side of the plate portion, and the emission side phase difference plate may be held between the emission side polarizing plate and the emission side light transmitting plate at an inner side of the body portion. According to the configuration, the emission side polarizing plate and the emission side phase difference plate can be easily arranged at appropriate positions, respectively.

In this case, the emission side phase difference plate may be held at the inner side of the body portion at a posture inclined to the emission side polarizing plate.

In the aspect of the invention, it is preferable that the second frame includes a plate-like member which forms the plate portion, and a cylindrical member which is provided separately from the plate-like member and protrudes from the plate-like member toward the opposite side of the first frame in a state of being fixed to the plate-like member to form the body portion. According to the configuration, the plate portion (plate-like member) and the body portion (cylindrical member) can be respectively formed by appropriate materials.

In the aspect of the invention, it is preferable that the thickness of the plate portion is thicker than the thickness of the body portion, and an attaching portion for an electronic apparatus on which the electro-optic panel is mounted is formed in the plate portion. According to the configuration, when an electronic apparatus is assembled, the positions of the electro-optic panel and the emission side partitioning member can be determined based on the second frame.

In the aspect of the invention, the electro-optic panel may include a first substrate, a second translucent substrate which is arranged to face the first substrate at the emission side, and an electro-optic layer which is provided between the first substrate and the second substrate.

The electro-optic module according to the aspect of the invention can be used for various electronic apparatuses. In addition, in the case in which the electro-optic module forms a projection type display apparatus as an electronic apparatus, the electronic apparatus includes a light source portion that emits light to be supplied to the electro-optic module, and a projection optical system that projects light modulated by the electro-optic module.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described with reference to the drawings. In the following description, as an electronic apparatus to which the invention is applied, a projection type display apparatus in which an electro-optic module including a transmission type electro-optic panel (transmission type liquid crystal panel) is used as a light valve is described. In addition, in the drawings referred to in the following description, the scales are made different among layers and members such that the layers and the members are made to have different sizes that can be recognized in the drawings. Further, in the following description, a projection type display apparatus (electronic apparatus) on which the electro-optic module to which the invention is applied is mounted and a configuration of an electro-optic panel used for the electro-optic module to which the invention is applied will be described and then an electro-optic module according to each embodiment will be described.

Configuration of Projection Type Display Apparatus (Electronic Apparatus)

Figure 1A:
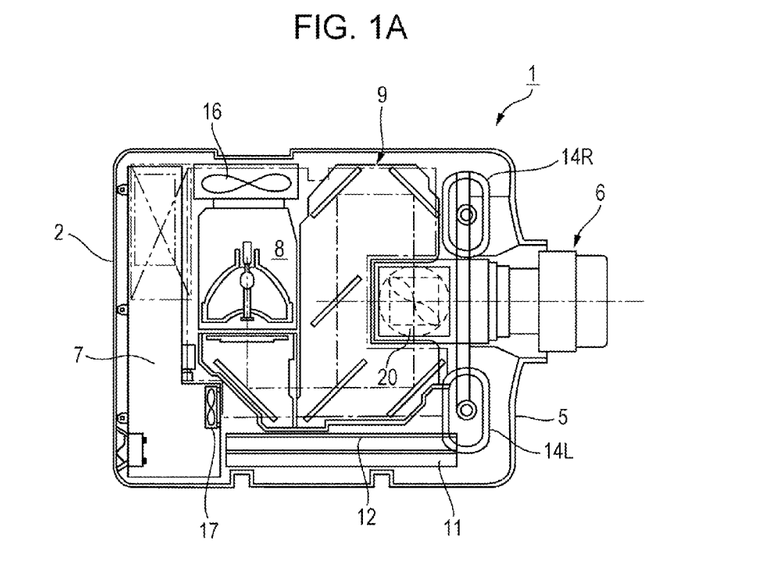
FIGS. 1A and 1B are views illustrating a projection type display apparatus as an example of an electronic apparatus to which the invention is applied.
Figure 1B:
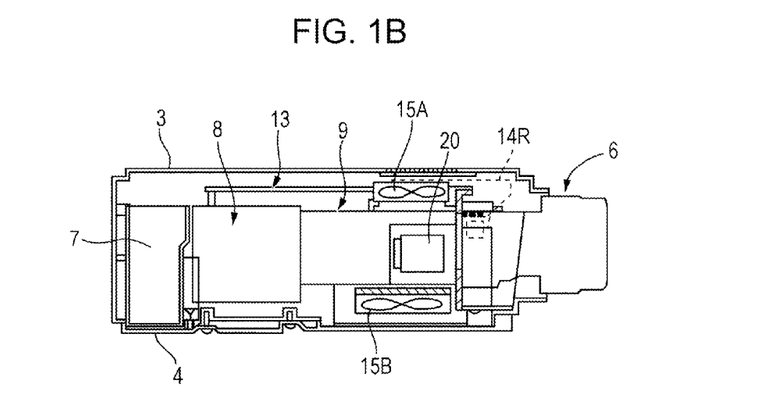
Figure 2:
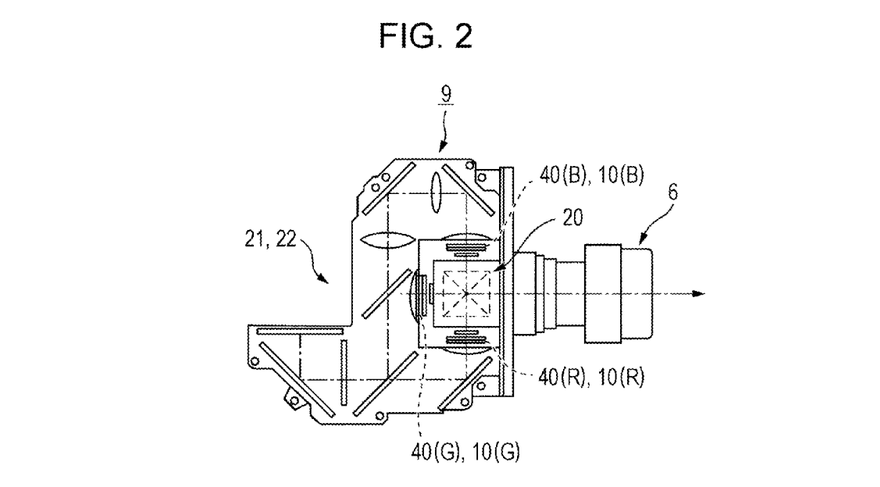
FIG. 2 is a view illustrating a configuration of an optical unit used for the projection type display apparatus to which the invention is applied.

FIGS. 1A and 1B are views illustrating a projection type display apparatus as an example of an electronic apparatus to which the invention is applied. FIG. 1A is a view illustrating a planar configuration of a main part of the projection type display apparatus and FIG. 1B is a view illustrating the main part of the projection type display apparatus when seen from the side. FIG. 2 is a view illustrating a configuration of an optical unit used for the projection type display apparatus to which the invention is applied.

In a projection type display apparatus 1 as illustrated in FIGS. 1A and 1B, a power supply unit 7 is arranged in an exterior case 2 at the rear end side and a light source lamp unit 8 (light source portion) and an optical unit 9 are arranged at positions adjacent to the power supply unit 7 at the front side of the apparatus. Further, the base end side of a projection lens unit 6 is located in the exterior case 2 at the center of the front side of the optical unit 9. An interface substrate 11 on which an input/output interface circuit is mounted is arranged at one side of the optical unit 9 along the front/rear direction of the apparatus. A video substrate 12 on which a video signal processing circuit is mounted is arranged to be parallel with the interface substrate 11. A control substrate 13 for controlling the driving of the apparatus is arranged above the light source lamp unit 8 and the optical unit 9 and speakers 14R and 14L are arranged at right and left corners at the front end side of the apparatus.

Suction fans 15A and 15B for cooling the inside of the apparatus are arranged above and under the optical unit 9. In addition, an exhaust fan 16 is arranged on a side surface of the apparatus which is a rear surface side of the light source lamp unit 8. Further, an auxiliary cooling fan 17 for sucking cooling air flowing from the suction fan 15A into the power supply unit 7 is arranged at a position facing ends of the interface substrate 11 and the video substrate 12. Among these fans, the suction fan 15B mainly functions as a cooling fan of a liquid crystal panel, which will be described later.

In FIG. 2, each optical element forming the optical unit 9 includes a prism unit 20 forming a color light synthesizing unit and is supported by an upper light guide 21 or a lower light guide 22 made of metals such as Mg and Al. The upper light guide 21 and the lower light guide 22 are fixed to an upper case 3 and a lower case 4 with fixing screws, respectively.

Detailed Configuration of Optical Unit 9

Figure 3:
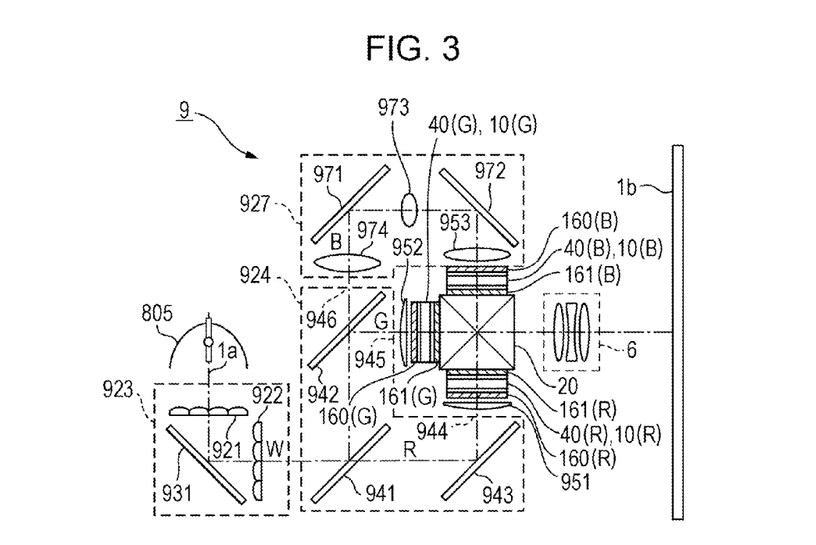
FIG. 3 is a view illustrating a detailed configuration of the optical unit used for the projection type display apparatus to which the invention is applied.

FIG. 3 is a view illustrating a detailed configuration of the optical unit used for the projection type display apparatus to which the invention is applied. As illustrated in FIG. 3, the optical unit 9 includes a light source lamp 805, an illumination optical system 923 which has integrator lenses 921 and 922 as uniform illumination optical elements, and a color light separation optical system 924 which separates a light flux W emitted from the illumination optical system 923 to light fluxes R, G, and B of red, green, and blue, respectively. In addition, the optical unit 9 includes three transmission type electro-optic panels 40(R), 40(G) and 40(B) as electro-optic panels (light valves), a prism unit 20 as a color light synthesis optical system, and the projection lens unit 6. The transmission type electro-optic panels 40(R), 40(G) and 40(B) modulate the light fluxes of the respective colors. The prism unit 20 synthesizes the modulated color light fluxes. The projection lens unit 6 projects the synthesized light flux onto a projection surface in an enlarged manner. In addition, a relay optical system 927 which introduces the blue light flux B among the light fluxes of the respective colors which have been separated by the color light separation optical system 924 to the corresponding electro-optic panel 40(B) is provided.

The illumination optical system 923 further includes a reflecting mirror 931. An optical axis 1a of the light emitted from the light source lamp 805 is bent to a right angle toward the front direction of the apparatus with the reflecting mirror 931. The integrator lenses 921 and 922 are arranged in a state of being orthogonal to each other at the front/rear sides while interposing the reflecting mirror 931 therebetween.

The color light separation optical system 924 is configured by a blue-green reflecting dichroic mirror 941, a green reflecting dichroic mirror 942, and a reflecting mirror 943. First, in the light fluxes W which has passed through the illumination optical system 923, the blue light flux B and the green light flux G contained therein are reflected to a right angle by the blue-green reflecting dichroic mirror 941 and travel toward the side of the green reflecting dichroic mirror 942. The red light flux R passes through the blue-green reflecting dichroic mirror 941, is reflected to a right angle by the reflecting mirror 943 at the rear side, and is emitted to the color light synthesis optical system from an emission portion 944 for the red light flux. Next, only the green light flux G of the blue and green light fluxes B and G which have been reflected by the blue-green reflecting dichroic mirror 941 is reflected to a right angle by the green reflecting dichroic mirror 942 and is emitted to the color light synthesis optical system from an emission portion 945 for the green light flux. The blue light flux B which has passed through the green reflecting dichroic mirror 942 is emitted to the relay optical system 927 from an emission portion 946 for the blue light flux. In the embodiment, distances from the emission portion of the light flux of the illumination optical system 923 to the emission portions 944, 945, and 946 for the light fluxes of the respective colors on the color light separation optical system 924 are set to be substantially equal to one another.

Condenser lenses 951 and 952 are arranged respectively at the emission sides of the emission portions 944 and 945 for the red light flux and the green light flux on the color light separation optical system 924. Accordingly, the red light flux and the green light flux emitted from the respective emission portions are incident on the condenser lenses 951 and 952, respectively, so as to be made parallel with each other.

Polarization directions of the red and green light fluxes R and G which have been made parallel with each other are aligned by incident side polarizing plates 160(R) and 160(G). Thereafter, red and green light fluxes R and G are incident on the electro-optic panels 40(R) and 40(G) and are modulated. Then, image information corresponding to the respective color light components is added to the red and green light fluxes. That is, the electro-optic panels 40(R) and 40(G) are controlled by image signals corresponding to the image information by a driving unit (not illustrated) in a switching manner and according to this switching control, the respective color light components passing through the electro-optic panels are modulated. As the driving unit, a known unit can be used as it is.

On the other hand, the polarization direction of the blue light flux B is further aligned by an incident side polarizing plate 160(B) through the relay optical system 927, is then introduced to the corresponding electro-optic panel 40(B) and is modulated according to image information in the same manner. The relay optical system 927 is configured by a condenser lens 974, an incident side reflecting mirror 971, an emission side reflecting mirror 972, an intermediate lens 973 arranged between the mirrors, and a condenser lens 953 arranged at the front side of the electro-optic panel 40(B). In terms of lengths of optical paths of the respective color light fluxes, that is, distances from the light source lamp 805 to the respective liquid crystal panels, the optical path of the blue light flux B is the longest. Accordingly, the light amount loss of the blue light flux B is the largest. However, the relay optical system 927 is interposed therebetween so that the light amount loss can be suppressed.

The light fluxes of the respective colors, which have passed through the electro-optic panels 40(R), 40(G) and 40(B) and have been modulated, are incident on emission side polarizing plates 161(R), 161(G) and 161(B) respectively and the light that have transmitted through the polarizing plates are incident on the prism unit 20 (cross dichroic prism) to be synthesized. A color image synthesized on the prism unit is projected onto a projection target surface 1b such as a screen located at a predetermined position in an enlarged manner through the projection lens unit 6 including a projection lens system.

In the embodiment, as described later, an emission side phase difference plate is arranged between the electro-optic panels 40(R), 40(G) and 40(B) and the emission side polarizing plates 161(R), 161(G) and 161(B).

Configuration of Electro-Optic Panel 40

Figure 4A:
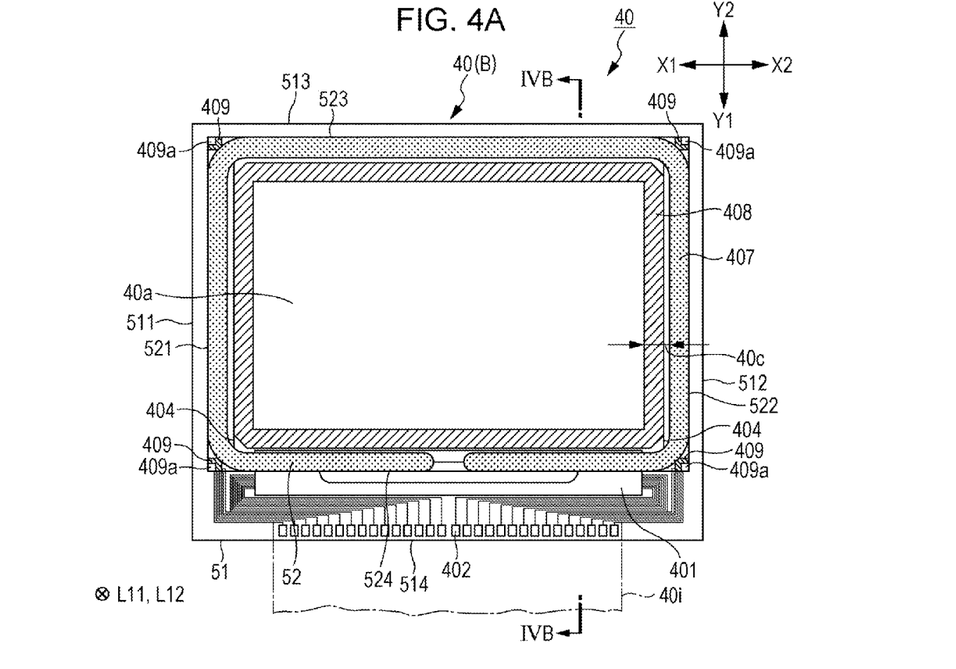
FIGS. 4A and 4B are views illustrating an electro-optic panel used for an electro-optic module to which the invention is applied.
Figure 4B:
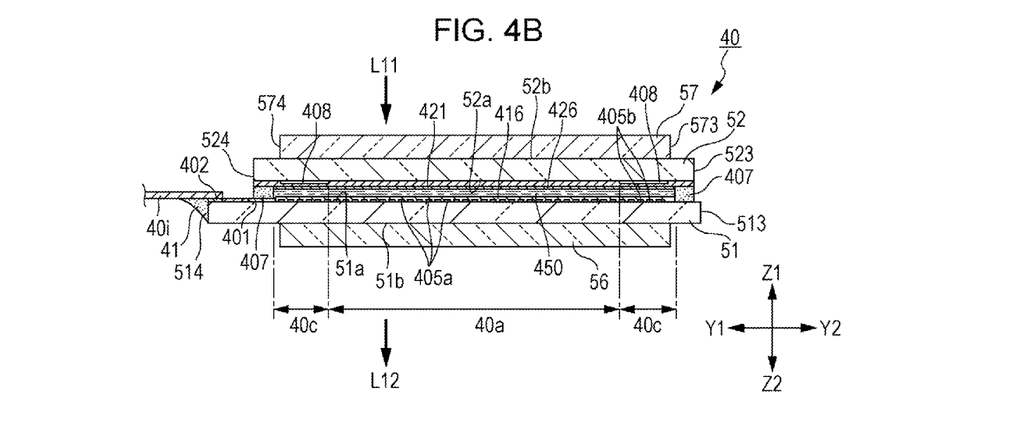

FIGS. 4A and 4B are views illustrating the electro-optic panel 40 used for the electro-optic module to which the invention is applied. FIG. 4A is a plan view illustrating the electro-optic panel 40 and constituent components thereof when seen from the side of a second substrate (counter substrate) and FIG. 4B is a cross-sectional view thereof cut along line IVB-IVB in FIG. 4A.

In FIGS. 4A and 4B, and FIGS. 5A to 9, and the like, which will be described later, a traveling direction of the source light is indicated by an arrow L11, and a traveling direction of display light obtained by modulating the source light by the electro-optic panel 40 is indicated by an arrow L12. Further, in the following description, one of two directions intersecting with each other in the in-plane directions of the electro-optic panel 40 and the electro-optic module is set to the X-axis direction, the other direction thereof is set to the Y-axis direction, and a direction intersecting with the X-axis direction and the Y-axis direction is set to the Z-axis direction. In addition, in the drawings referred to below, one side (side at which a flexible wiring board 40i is provided) in the Y-axis direction is expressed as the Y1 side, the other side in the Y-axis direction is expressed as the Y2 side, one side in the X-axis direction is expressed as the X1 side, the other side in the X-axis direction is expressed as the X2 side, one side (side at which the source light is incident) in the Z-axis direction is expressed as the Z1 side, and the other side (side from which the display light is emitted) is expressed as the Z2 side.

In the projection type display apparatus 1 as described with reference to FIGS. 1A to 3, when the electro-optic panels 40(R), 40(G) and 40(B) are mounted on the optical unit 9, the electro-optic panels 40(R), 40(G) and 40(B) are mounted as electro-optic modules 10(R), 10(G) and 10(B), which will be described later, respectively. Here, the electro-optic panels 40(R), 40(G) and 40(B) have the same configuration. The electro-optic modules 10(R), 10(G) and 10(B) including the electro-optic panels 40(R), 40(G) and 40(B) for red (R), green (G), and blue (B) also have the same configuration. Accordingly, in the following description, descriptions of the electro-optic panels 40(R), 40(G) and 40(B), the electro-optic modules 10(R), 10(G) and 10(B), and the like, are made while descriptions of (R), (G), and (B) indicating corresponding colors are omitted.

As illustrated in FIGS. 4A and 4B, on the electro-optic panel 40, a first translucent substrate 51 (element substrate) and a second translucent substrate 52 (counter substrate) are bonded to each other with a sealing material 407 through a predetermined space. Silica glass, heat resistant glass, or the like is used for the first substrate 51 and the second substrate 52. In the embodiment, the silica glass is used for the first substrate 51 and the second substrate 52. In the embodiment, the electro-optic panel 40 is a liquid crystal panel, and a liquid crystal layer as an electro-optic layer 450 is held in a region surrounded by the sealing material 407 between the first substrate 51 and the second substrate 52. The sealing material 407 is provided in a frame shape along outer edges of the second substrate 52. The sealing material 407 may be a photo-curable adhesive, a heat-curable adhesive, or a photo-curable and heat-curable adhesive. A glass fiber or a gap material such as glass beads for setting a distance between the both substrates to a predetermined value is blended in the sealing material.

In the embodiment, the first substrate 51 has a square shape and includes side surfaces 511, 512, 513 and 514 on four sides. The second substrate 52 also has a square shape and includes side surfaces 521, 522, 523 and 524 on four sides in the same manner as the first substrate 51. An image display region 40a which emits modulated light is provided at substantially the center of the electro-optic panel 40 as a square region. The sealing material 407 is also provided to have a substantially square shape so as to correspond to the shape and a peripheral region 40c having a square frame shape is provided between the inner peripheral edge of the sealing material 407 and the outer peripheral edge of the image display region 40a.

In the embodiment, the first substrate 51 has a size larger than the second substrate 52 and the four side surfaces 511, 512, 513 and 514 of the first substrate 51 protrude at the outer sides of the side surfaces 521, 522, 523 and 524 of the second substrate 52, respectively. Therefore, step portions are formed by the first substrate 51 and the side surfaces 521, 522, 523 and 524 of the second substrate 52 around the second substrate 52 and in the step portions, the first substrate 51 is exposed from the second substrate 52. In addition, among the four side surfaces 511, 512, 513 and 514, the side surface 514 located at the one side Y1 in the Y-axis direction largely protrudes from the side surface 524 of the second substrate 52 compared to other side surfaces 511, 512 and 513, and a data line driving circuit 401 and plural terminals 402 are formed on the first substrate 51 along the side surface 514. In addition, scanning line driving circuits 404 are formed on the first substrate 51 along the side surfaces 511 and 512. The flexible wiring board 40i is connected to the terminals 402 and various potentials and various signals are input to the first substrate 51 through the flexible wiring board 40i. On the first substrate 51, an adhesive 41 for reinforcement is applied to straddle the side surface 514 and the flexible wiring board 40i.

On a first surface 51a which is opposed to the second substrate 52 in the first surface 51a and a second surface 51b of the first substrate 51, pixels including translucent pixel electrodes 405a and pixel transistors (switching elements (not illustrated)) corresponding to the pixel electrodes 405a are formed in a matrix form in the image display region 40a, and an alignment film 416 is formed at an upper layer side of the pixel electrodes 405a. In addition, on the first surface 51a of the first substrate 51, dummy pixel electrodes 405b which are formed simultaneously with the pixel electrodes 405a are formed in the peripheral region 40c.

On a first surface 52a which is opposed to the first substrate 51 in the first surface 52a and a second surface 52b of the second substrate 52, a translucent common electrode 421 is formed and an alignment film 426 is formed on an upper layer of the common electrode 421. The common electrode 421 is formed to straddle substantially the entire surface of the second substrate 52 or plural pixels as plural band-like electrodes. In the embodiment, the common electrode 421 is formed on the substantially entire surface of the second substrate 52. In addition, a light shielding layer 408 is formed on the first surface 52a of the second substrate 52 at the lower layer side of the common electrode 421. In the embodiment, the light shielding layer 408 is formed in a frame-like form extending along an outer peripheral edge of the image display region 40a and the image display region 40a is defined with the inner edges of the light shielding layer 408. The outer peripheral edge of the light shielding layer 408 is located at a position spaced apart from the inner peripheral edge of the sealing material 407. The light shielding layer 408 and the sealing material 407 are not overlapped with each other. In addition, a light shielding layer which is formed simultaneously with the light shielding layer 408 may be formed on the second substrate 52 at a region overlapped with a region interposed between the adjacent pixel electrodes 405a as a black matrix or a black stripe in some cases.

Inter-substrate conducting electrodes 409 are formed on the first substrate 51 at regions overlapped with the corner portions of the second substrate 52 at the outer side of the sealing material 407 for realizing electrical conduction between the first substrate 51 and the second substrate 52. Inter-substrate conducting materials 409a containing conductive particles are arranged between the inter-substrate conducting electrodes 409 and the second substrate 52, and the common electrode 421 of the second substrate 52 is electrically connected to the first substrate 51 through the inter-substrate conducting materials 409a and the inter-substrate conducting electrodes 409. Therefore, a common potential is applied to the common electrode 421 from the side of the first substrate 51. The sealing material 407 is provided along the outer peripheral edge of the second substrate 52 with a substantially constant width. However, the sealing material 407 is provided at the inner side on regions overlapped with the corner portions of the second substrate 52 so as to avoid the inter-substrate conducting electrodes 409.

In the embodiment, since the pixel electrodes 405a and the common electrode 421 are formed with translucent conductive films such as ITO films on the electro-optic panel 40 having the above-described configuration, the electro-optic panel 40 is a transmission type liquid crystal panel. In the case of the transmission type liquid crystal panel (electro-optic panel 40), light which has been incident from one side of the first substrate 51 or the second substrate 52 is modulated while the light transmits through the other side of the substrates and is emitted. In the embodiment, the light (indicated by the arrow L11) which has been incident from the second substrate 52 transmits through the first substrate 51 and is emitted as modulated light (indicated by the arrow L12). Therefore, the second substrate 52 is arranged on one side Z1 in the Z-axis direction, and the first substrate 51 is arranged on the other side Z2 in the Z-axis direction.

When the common electrode 421 is formed with a translucent conductive film and the pixel electrodes 405a are formed with a reflective conductive film, a reflection type liquid crystal panel can be formed. In the case of the reflection type liquid crystal panel, the light incident from the second substrate 52 is modulated while being reflected on the first substrate 51 and emitted. In this case, the second substrate 52 is required to be translucent but the first substrate 51 is not required to be translucent.

The electro-optic panel 40 of the embodiment is used as a light valve on the above-described projection type display apparatus (liquid crystal projector) so that a color filter is not formed. However, in the case in which the electro-optic panel 40 is used as a direct view type color display apparatus in an electronic apparatus such as a mobile computer and a mobile phone, a color filter is formed on the second substrate 52.

First Embodiment

Overall Configuration of Electro-Optic Module 10

Figure 5A:
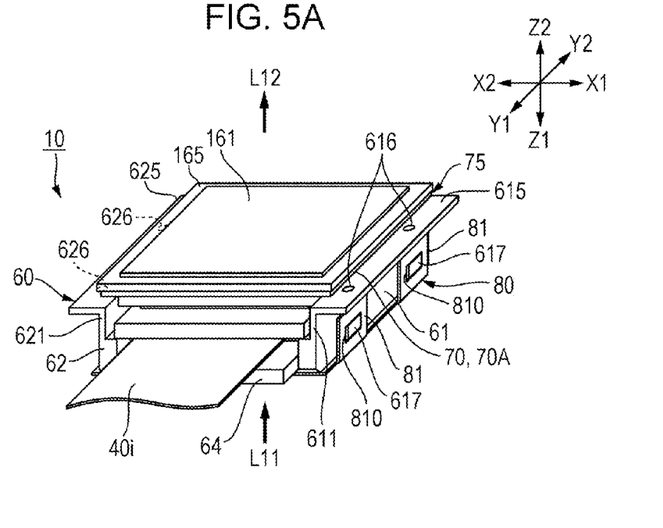
FIGS. 5A and 5B are perspective views illustrating the electro-optic module according to a first embodiment of the invention when seen from an image light emission side.
Figure 5B:
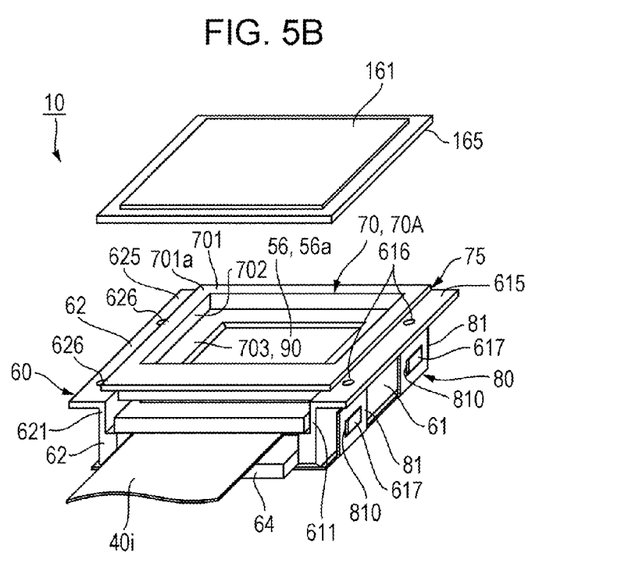
Figure 6:
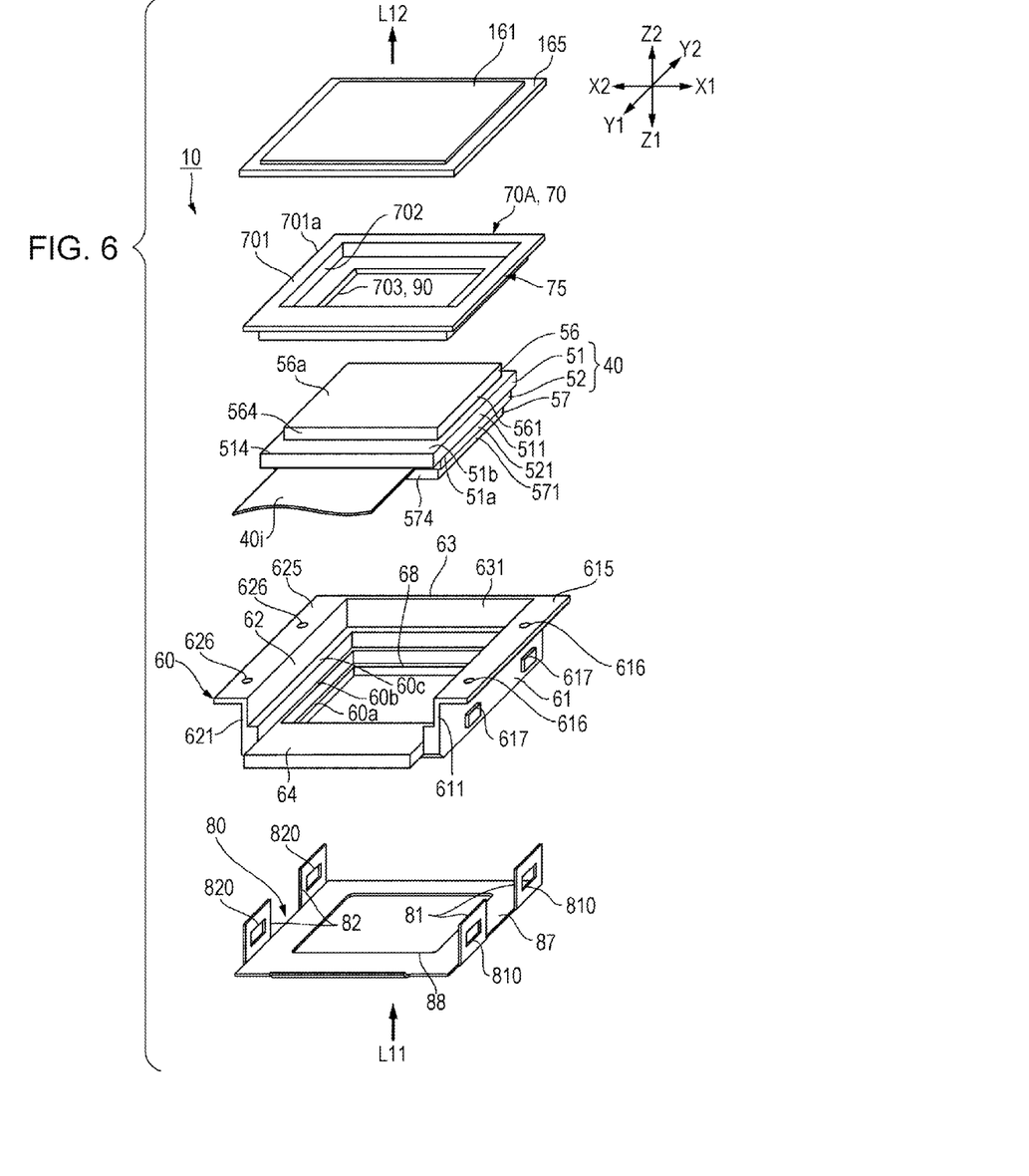
FIG. 6 is an exploded perspective view illustrating the electro-optic module according to the first embodiment of the invention when seen from an image light emission side.
Figure 7A:
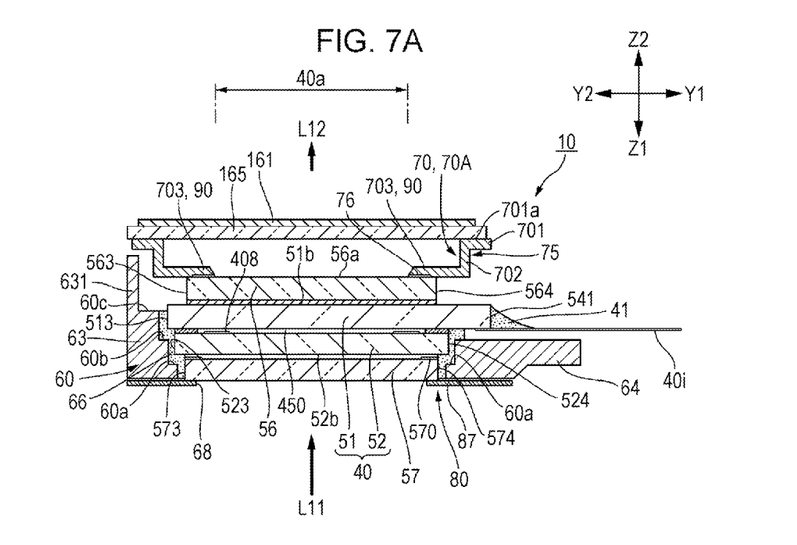
FIGS. 7A and 7B are cross-sectional views of the electro-optic module according to the first embodiment of the invention.
Figure 7B:
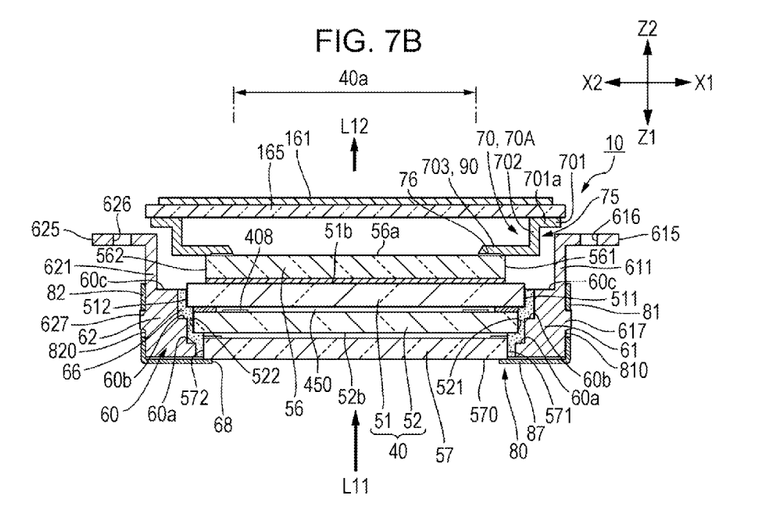

FIGS. 5A and 5b are perspective views illustrating the electro-optic module 10 according to the first embodiment of the invention when seen from the image light emission side. FIG. 5A is a perspective view illustrating the electro-optic module 10 in a state in which the emission side polarizing plate 161 is attached and FIG. 5B is a perspective view illustrating the electro-optic module 10 in a state in which the emission side polarizing plate 161 is detached. FIG. 6 is an exploded perspective view illustrating the electro-optic module 10 according to the first embodiment of the invention when seen from an image light emission side. FIGS. 7A and 7B are cross-sectional view of the electro-optic module 10 according to the first embodiment of the invention. FIG. 7A is an YZ cross-sectional view and FIG. 7B is an XZ cross-sectional view.

When the electro-optic panel 40 as described above with reference to FIGS. 4A and 4B is mounted on the projection type display apparatus 1 and the optical unit 9 as described above with reference to FIGS. 1A to 3, the electro-optic module 10 in which the electro-optic panel 40 is held by a first frame 60 for reinforcement and the like is formed as illustrated in FIGS. 5A to 7B. Further, in the electro-optic module 10 of the embodiment, a second frame 70, which will be described later, is used in addition to the electro-optic panel 40 and the first frame 60. In addition, in the electro-optic module 10 of the embodiment, an emission side light transmitting plate 56 and an incident side light transmitting plate 57 are fixed to the electro-optic module 10.

Configurations of Emission Side Light Transmitting Plate 56 and Incident Side Light Transmitting Plate 57

In the electro-optic panel 40, the emission side light transmitting plate 56 is fixed to the second surface 51b of the first substrate 51 (image light emission surface, outer surface) with a translucent adhesive, and the incident side light transmitting plate 57 is fixed to the second surface 52b of the second substrate 52 (image light incident surface, outer surface) with a translucent adhesive. The emission side light transmitting plate 56 and the incident side light transmitting plate 57 are formed as a dust-proof glass and prevent dust and the like from adhering to the second surface 51b of the first substrate 51 and the second surface 52b of the second surface 52. Therefore, even if the dust adheres to the electro-optic panel 40, the dust is separated from the electro-optic layer 450. Accordingly, dusts can be prevented from being portrayed on an image projected from the projection type display apparatus 1 which has been described with reference to FIGS. 1A and 1B and the like. For the emission side light transmitting plate 56 and the incident side light transmitting plate 57, silica glass, heat-resistant glass, or the like is used. In the embodiment, silica glass is used for the emission side light transmitting plate 56 and the incident side light transmitting plate 57 similar to the first substrate 51 and the second substrate 52.

The emission side light transmitting plate 56 is provided so as to be overlapped with the image display region 40a of the electro-optic panel 40. The emission side light transmitting plate 56 has a square shape having a size smaller than the first substrate 51 and side surfaces 561, 562, 563 and 564 of the emission side light transmitting plate 56 are respectively located on the inner sides of the side surfaces 511, 512, 513 and 514 of the first substrate 51 on the entire circumference of the emission side light transmitting plate 56. Accordingly, the second surface 51b of the first substrate 51 of the electro-optic panel 40 is exposed from the emission side light transmitting plate 56 at both sides in the X-axis direction and both sides in the Y-axis direction. In addition, step portions are formed by the side surfaces 561, 562, 563 and 564 of the emission side light transmitting plate 56 and the first substrate 51.

The incident side light transmitting plate 57 is provided so as to be overlapped with the image display region 40a of the electro-optic panel 40. The incident side light transmitting plate 57 has a square shape having a size which is substantially the same as that of the emission side light transmitting plate 56 and smaller than the second substrate 52. Therefore, side surfaces 571, 572, 573 and 574 of the incident side light transmitting plate 57 are respectively located at the inner sides of the side surfaces 521, 522, 523 and 524 of the second substrate 52 on the entire circumference of the incident side light transmitting plate 57. Accordingly, the second surface 52b of the second substrate 52 of the electro-optic panel 40 is exposed from the incident side light transmitting plate 57 at both sides in the X-axis direction and both sides in the Y-axis direction. In addition, step portions are formed by the side surfaces 571, 572, 573 and 574 of the incident side light transmitting plate 57 and the second substrate 52 around the incident side light transmitting plate 57.

Configuration of First Frame 60

The first frame 60 is a resin member or a metal member having a rectangular frame shape and includes an opening 68 having a rectangular shape at the center of the one side Z1 in the Z-axis direction (incident side of source light) and four side walls 61, 62, 63 and 64 surrounding the electro-optic panel 40. In the embodiment, the first frame 60 is a metal member. When a plate-like incident side partitioning member 80, which will be described later, is attached to the first frame 60, a panel accommodating portion is formed at the inner side of the first frame 60 and the panel accommodating portion has a bottom portion formed by the incident side partitioning member 80.

In the first frame 60, a multistage structure corresponding to the shapes of the end portions in a state in which the emission side light transmitting plate 56 is bonded to the electro-optic panel 40 are formed on the inner side surfaces of the side walls 61, 62 and 63. More specifically, step portions 60a and 60b are formed on the inner side surfaces of the side wall 61 located at the one side X1 in the X-axis direction, the side wall 62 located at the other side X2 in the X-axis direction, and the side wall 63 located at the other side Y2 in the Y-axis direction along the Z-axis direction. In addition, in the first frame 60, a step portion 60c, which makes side plate portions 611, 621 and 631 protrude toward the image light emission side (the other side Z2 in the Z-axis direction) separated from the side surfaces 561, 562 and 563 of the emission side light transmitting plate 56 in the X-axis direction and the Y-axis direction, is formed on the inner side surfaces of the side walls 61, 62 and 63.

In the embodiment, in the first frame 60, flange plates 615 and 625 which are bent outwardly from the end portions of the side plate portions 611 and 621 at the other side Z2 in the Z-axis direction are formed. On the flange plates 615 and 625, attaching portions 616 and 626 for determining the position of the electro-optic module 10 when the electro-optic module 10 is mounted on the projection type display apparatus 1 (electronic apparatus) described with reference to FIGS. 1A and 1B are formed. The attaching portions 616 and 626 are holes for, for example, fixing by an adhesive or fixing by beads. In the embodiment, the attaching portions 616 and 626 are formed with holes where fixing with an UV adhesive is carried out.

The side wall 64 located at the one side Y1 in the Y-axis direction is a plate-like portion having a size smaller than the side walls 61, 62 and 63 in the Z-axis direction and only the step portion 60a is formed on the inner side surface of the side wall 64. Therefore, the flexible wiring board 40i can be drawn out to the outer side of the first frame 60 extending along the in-plane direction of the electro-optic panel 40.

Configuration of Incident Side Partitioning Member 80

The plate-like incident side partitioning member 80 formed with a metal plate or a resin plate is arranged so as to be overlapped with the first frame 60 at the light incident side (one side Z1 in the Z-axis direction). In the embodiment, the incident side partitioning member 80 is made of a metal. The incident side partitioning member 80 includes a square end plate portion 87 which is overlapped with the first frame 60 on the image light emission side and an opening 88 is formed at the center of the end plate portion 87. The opening 88 is smaller than the opening 68 of the first frame 60. Therefore, the end plate portion 87 of the incident side partitioning member 80 can limit the range in which source light is incident on the electro-optic panel 40.

The incident side partitioning member 80 includes side plate portions 81 and 82 extending from the outer edges of the end plate portion 87 at both sides in the X-axis direction. Engagement holes 810 and 820 respectively corresponding to the side plate portions 81 and 82 are formed. On the other hand, on the side surface of the outer side of the side walls 61 and 62 of the first frame 60, protrusions 617 and 627 to be respectively fitted into the engagement holes 810 and 820 are formed. Accordingly, the side plate portions 81 and 82 provided so as to interpose the first frame 60 therebetween are engaged with the protrusions 617 and 627 of the first frame 60 so that the incident side partitioning member 80 is connected with the first frame 60 and is integrated with the first frame 60.

In the embodiment, in a region which is overlapped with the end plate portion 87 on the surface of the incident side light transmitting plate 57 on the side closer to the electro-optic panel 40, a light shielding layer 570 is provided. The incident range of source light from the incident side is limited by the light shielding layer 570 and the incident side partitioning member 80.

Configuration of Second Frame 70

The electro-optic module 10 of the embodiment include the second frame 70, which is fixed to at least one of the electro-optic panel 40, the emission side light transmitting plate 56 and the first frame 60, on the image light emission side (other side Z2 in the Z-axis direction) of the first frame 60. In the embodiment, the second frame 70 is made of a metal plate-like frame 70A which is fixed to a surface 56a of the emission side light transmitting plate 56 provided on the opposite side of the electro-optic panel 40 (image light emission side surface) by an adhesive 76.

The plate-like frame 70A (second frame 70) includes a frame-like fixing member 75 which is fixed to the surface 56a of the emission side light transmitting plate 56 provided on the opposite side of the electro-optic panel 40 (image light emission side surface) by the adhesive 76. The fixing member 75 is separated from the electro-optic panel 40 and the first frame 60 and is not fixed to the electro-optic panel 40 and the first frame 60. The fixing member 75 includes a frame-like plate portion 703 which is fixed to the surface 56a of the emission side light transmitting plate 56 provided on the opposite side of the electro-optic panel 40 (image light emission side surface) by the adhesive 76, and a cylindrical body portion 702 which protrudes from the outer edge of the plate portion 703 toward the opposite side of the first frame 60. The plate portion 703 has a square frame shape and the body portion 702 has a rectangular cylindrical shape. An end portion 701 of the body portion 702 provided on the opposite side of the plate portion 703 (opposite side of the first frame 60) is bent outwardly.

Here, an emission side partitioning member 90 is configured such that the inner edge side portions of the plate portion 703 are overlapped with the end portions of the emission side light transmitting plate 56 from the image light emission side. Accordingly, the emission side partitioning member 90 is configured to be integrated with the fixing member 75. In the embodiment, the inner edges of the light shielding layer 408 formed in the electro-optic panel 40 are located at the inner sides of the inner edges of the emission side partitioning member 90.

In the fixing member 75 of the second frame 70, the emission side polarizing plate 161 and the emission side phase difference plate 165 are held in the body portion 702 as optical elements. The emission side polarizing plate 161 has a square shape and the emission side phase difference plate 165 has a square shape having a size larger than the emission side polarizing plate 161. Accordingly, the emission side phase difference plate 165 is fixed to a surface 701a of the end portion 701 of the body portion 702 provided on the opposite side of the emission side light transmitting plate 56 by an adhesive or the like and the emission side polarizing plate 161 is fixed to a surface of the emission side phase difference plate 165 provided on the opposite side of the emission side light transmitting plate 56 by an adhesive or the like.

Manufacturing Method of Electro-Optic Module 10

The thus-configured electro-optic module 10 is manufactured in such a manner that a panel accommodating portion is formed at the inner side of the first frame 60 by attaching the incident side partitioning member 80 to the first frame 60 and then the electro-optic panel 40 in which the emission side light transmitting plate 56 and the incident side light transmitting plate 57 are bonded is accommodated in the panel accommodating portion. At this time, an adhesive 66 is applied to the inner surfaces of the side walls 61, 62, 63 and 64 of the first frame 60 in advance. Accordingly, the side surfaces 571, 572 and 573 of the incident side light transmitting plate 57 and the side surfaces of the electro-optic panel 40 (the side surfaces 511, 512 and 513 of the first substrate 51 and the side surfaces 521, 522 and 523 of the second substrate 52) can be fixed to the side walls 61, 62 and 63 of the first frame 60 by the adhesive 66. In addition, the side surface 574 of the incident side light transmitting plate 57 and the side surface of the electro-optic panel 40 (the side surface 524 of the second substrate 52) can be fixed to the side wall 64 of the first frame 60 by the adhesive 66.

Next, the second frame 70 to which the emission side phase difference plate 165 and the emission side polarizing plate 161 are fixed is fixed to the emission side surface 56a of the emission side light transmitting plate 56 by the adhesive 76. As a result, an electro-optic module 10 is obtained.

When the thus-configured electro-optic module 10 is mounted on the projection type display apparatus 1 (electronic apparatus) described with reference to FIGS. 1A and 1B, the electro-optic module 10 is fixed to the frame or the like of the projection type display apparatus 1 (electronic apparatus) by an adhesive through the attaching portions 616 and 626.

Main Effects of the Embodiment

As described above, in the electro-optic module 10 according to the embodiment, the emission side partitioning member 90 covers the emission side light transmitting plate 56 from the image light emission side and the emission side partitioning member 90 is provided on the second frame 70 provided on the image light emission side of the first frame 60. Therefore, since light leaking out from the side surfaces 561, 562, 563 and 564 of the emission side light transmitting plate 56 is shielded at the second frame 70, the light can be prevented from being emitted as stray light. Accordingly, it is possible to prevent the light leaking out from the side surfaces 561, 562, 563 and 564 of the emission side light transmitting plate 56 from becoming stray light and deteriorating image quality.

Further, the second frame 70 in which the emission side partitioning member 90 is provided is provided separately from the first frame 60. Thus, in the case in which the emission side partitioning member is provided in the integrated frame, when the electro-optic module 10 is assembled, the electro-optic panel 40 can be arranged at the inner side of the frame (at the inner side of the first frame 60) from the image light emission side.

In addition, the emission side partitioning member 90 is integrated with the fixing member 75 (plate portion 703) of the second frame 70. Therefore, the emission side partitioning member is not required to be used separately and thus the configuration of the electro-optic module 10 can be simplified. Accordingly, the cost for the parts used for the electro-optic module 10 can be reduced and the electro-optic module 10 can be effectively assembled.

In addition, since the module has a structure in which the emission side polarizing plate 161 and the emission side phase difference plate 165 are held in the second frame 70, the emission side polarizing plate 161 and the emission side phase difference plate 165 can be easily arrange at appropriate positions. For example, in the embodiment, the emission side polarizing plate 161 and the emission side phase difference plate 165 are held at the end portion 701 of the body portion 702 of the second frame 70 and are arranged at predetermined positions separated from the emission side light transmitting plate 56. Accordingly, it is possible to prevent heat generated from the electro-optic panel 40 from being transferred to the emission side polarizing plate 161 and the emission side phase difference plate 165 through the emission side light transmitting plate 56. Therefore, deterioration in the emission side polarizing plate 161 and the emission side phase difference plate 165 can be prevented.

Modification Example of First Embodiment

In the first embodiment, the configuration in which the emission side partitioning member 90 is integrated with the fixing member 75 has been adopted. However, the emission side partitioning member 90 may have a configuration in which a frame-like partitioning member which is provided separately from the fixing member 75 is fixed to the plate portion 703 of the fixing member 75 so as to protrude inwardly from the plate portion 703.

Second Embodiment

Figure 8:
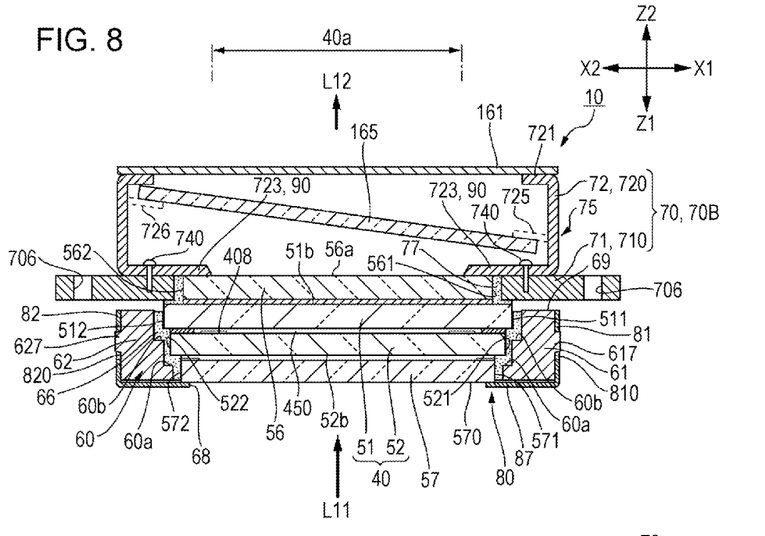
FIG. 8 is an XZ cross-sectional view of an electro-optic module according to a second embodiment of the invention.

FIG. 8 is an XZ cross-sectional view of an electro-optic module 10 according to a second embodiment of the invention. Since a basic configuration of the embodiment is the same as that of the first embodiment, the same reference numerals are used to common portions and description thereof is omitted.

As illustrated in FIG. 8, as in the first embodiment, the electro-optic module 10 of the embodiment also includes the second frame 70 which is fixed to at least one of the electro-optic panel 40, the emission side light transmitting plate 56 and the first frame 60 on the image light emission side of the first frame 60. In the embodiment, the second frame 70 is formed with a plate-like frame 70B whose surface is fixed to the four side surfaces of the emission side light transmitting plate 56, such as the side surfaces 561 and 562 and the like, and the image light emission side surface of the first substrate 51 of the electro-optic panel 40 (second surface 51b) by an adhesive 77. The first frame 60 is not formed with the side plate portions 611 and 621 and the like illustrated in FIGS. 7A and 7B and the emission side end portion 69 of the first frame 60 is located at a height equal to the height of the emission side surface of the first substrate 51 of the electro-optic panel 40 (second surface 51b). Accordingly, the second frame 70 is not fixed to the first frame 60 by bonding. In the embodiment, the first frame 60 is made of an aluminum metal material. Therefore, heat dissipation of the electro-optic module 10 through the first frame 60 is high.

In the embodiment, the plate-like frame 70B (second frame 70) includes the frame-like fixing member 75 which is fixed to the electro-optic panel 40 and the emission side light transmitting plate 56 by the adhesive 77. The fixing member 75 includes a frame-like plate portion 71 whose surface is fixed to the electro-optic panel 40 and the emission side light transmitting plate 56 by the adhesive 77, and a cylindrical body portion 72 which protrudes from the plate portion 71 toward the opposite side of the first frame 60. The plate portion 71 has a square frame shape and the body portion 72 has a rectangular cylindrical shape. An end portion 721 of the body portion 72 provided on the opposite side of the plate portion 71 (opposite side of the first frame 60) is bent inwardly.

When the plate-like frame 70B having such a configuration is formed, in the embodiment, a flat plate-like member 710 formed into a square frame shape, and a cylindrical member 720 having a rectangular frame shape fixed to the plate-like member 710 are used. The plate portion 71 is formed by the plate-like member 710 and the body portion 72 is formed by the cylindrical member 720. The plate-like member 710 and the cylindrical member 720 are made of metal but the thickness of the plate-like member 710 is thicker than the thickness of the cylindrical member 720. In the embodiment, the plate-like member 710 and the cylindrical member 720 are made of an iron-based metal material such as SPPC. According to the metal material, it is possible to secure heat dissipation. In addition, since the plate-like member 710 and the cylindrical member 720 are made of the same metal material, the thermal expansion coefficients of the members are the same. Accordingly, distortion does not easily occur even when the temperature changes.

The plate-like member 710 protrudes from the first frame 60 toward the both sides in the X-axis direction when seen from the emission side and, at portions in the second frame 70, which protrude from the first frame 60 toward the X-axis direction when seen from the emission side, attaching portions 706 for determining and fixing the position of the electro-optic module 10 when the electro-optic module 10 is mounted on the projection type display apparatus 1 (electronic apparatus) which has been described with reference to FIGS. 1A and 1B are formed. The attaching portions 706 are formed with holes for fixing by an adhesive or fixing by beads. In the embodiment, the attaching portions 706 are holes where fixing with an UV adhesive is carried out.

The cylindrical member 720 includes frame-like end plate portions 723 which protrude inwardly from the end portions of the side closer to the plate-like member 710 and the end plate portions 723 are fixed to the plate-like member 710 by beads 740. Here, the inner side end portion of the end plate portion 723 protrudes inwardly and is overlapped with the emission side light transmitting plate 56 from the image light emission side to form the emission side partitioning member 90. Accordingly, the emission side partitioning member 90 is integrated with the fixing member 75. In the embodiment, the inner edge of the light shielding layer 408 formed in the electro-optic panel 40 is located at an inner side of the inner edge of the emission side partitioning member 90.

In the fixing member 75 of the second frame 70, the emission side polarizing plate 161 and the emission side phase difference plate 165 are held as optical elements. In the embodiment, the emission side polarizing plate 161 and the emission side phase difference plate 165 are held in the body portion 72. More specifically, the emission side polarizing plate 161 is fixed to the end portion 721 of the body portion 72 on the opposite side of the plate-like member 710 (plate portion 71) by an adhesive or the like and the emission side phase difference plate 165 is held between the emission side polarizing plate 161 and the emission side light transmitting plate 56 at the inner side of the body portion 72.

In the embodiment, the emission side phase difference plate 165 is held at the inner side of the body portion 72 at a posture inclined to the emission side polarizing plate 161. More specifically, two support plate portions 725 and 726 which protrude inwardly from the side surfaces facing each other in the X-axis direction are formed in the body portion 72, and the emission side phase difference plate 165 is fixed to the support plate portions 725 and 726 by an adhesive or the like. Here, the support plate portions 725 and 726 are formed at positions separated in the image light emission direction. Accordingly, the emission side phase difference plate 165 is held at the inner side of the body portion 72 at a posture inclined to the emission side polarizing plate 161. In FIG. 8, an embodiment in which the emission side phase difference plate 165 is directly fixed to the support plate portions 725 and 726 is illustrated as an example. However, it is preferable that the emission side phase difference plate 165 is fixed by attaching the emission side phase difference plate 165 to a holder made of a metal plate or the like and adjusting the angle of the holder to the support plate portions 725 and 726.

In order to manufacture the electro-optic module 10 having such a configuration, the electro-optic panel 40 to which the emission side light transmitting plate 56 and the incident side light transmitting plate 57 are bonded is fixed to the inner side of the first frame 60 by the adhesive 66 and then the second frame 70 to which the emission side phase difference plate 165 and the emission side polarizing plate 161 are fixed is fixed by the adhesive 77. As a result, the electro-optic module 10 is obtained.

When the electro-optic module 10 which has been described with reference to FIGS. 1A and 1B is mounted on the projection type display apparatus 1 (electronic apparatus), the electro-optic module 10 is fixed to a frame or the like of the projection type display apparatus 1 (electronic apparatus) through the attaching portions 706 by an adhesive. At this time, it is preferable that the frame or the like of the projection type display apparatus 1 (electronic apparatus) is made of the same material as the plate-like member 710. According to the configuration, since the frame and the plat-like member have the same thermal expansion coefficient, the position of the electro-optic module 10 can be prevented from being shifted even when the temperature changes.

As described above, in the electro-optic module 10 of the embodiment, the emission side partitioning member 90 covers the emission side light transmitting plate 56 from the image light emission side and the emission side partitioning member 90 is provided in the second frame 70 provided on the image light emission side of the first frame 60. Therefore, since light leaking out from the side surfaces 561, 562, 563 and 564 of the emission side light transmitting plate 56 is shielded at the second frame 70, the light is prevented from being emitted as stray light. Accordingly, it is possible to prevent the light leaking out from the side surfaces 561, 562, 563 and 564 of the emission side light transmitting plate 56 from becoming stray light and deteriorating image quality.

In addition, since the second frame 70 in which the emission side partitioning member 90 is provided is provided separately from the first frame 60, unlike the case in which the emission side partitioning member is integrated with the frame, when the electro-optic module is assembled, the electro-optic panel 40 can be arranged at the inner side of the frame from the image light emission side (at the inner side of the first frame 60). Further, since the emission side partitioning member 90 is formed to be integrated with the fixing member 75 (plate portion 71) of the second frame 70, a separate emission side partitioning member is not required to be used.

In addition, since the configuration in which the emission side polarizing plate 161 and the emission side phase difference plate 165 are held in the second frame 70, the emission side polarizing plate 161 and the emission side phase difference plate 165 can be easily arranged at appropriate positions. For example, since the emission side polarizing plate 161 and the emission side phase difference plate 165 are held in the body portion 72 of the second frame 70, the emission side polarizing plate 161 and the emission side phase difference plate 165 can be arranged at predetermined positions which are separated. Further, the emission side phase difference plate 165 can be arranged at a posture inclined to the emission side polarizing plate 161.

In addition, in the second frame 70, the plate portion 71 and the body portion 72 are made of an iron-based metal material such as SPPC. According to the metal material, it is possible to secure heat dissipation. In addition, since the plate portion 71 and the body portion 72 are made of the same metal material, the thermal expansion coefficients of the members are the same. Accordingly, distortion does not easily occur even when the temperature changes.

Modification Example 1 of Second Embodiment

In the second embodiment, the emission side partitioning member 90 has the configuration in which the end plate portion 723 of the cylindrical member 720 used for the second frame 70 (plate-like frame 70B) is overlapped with the emission side light transmitting plate 56 from the emission side. However, a configuration in which a protrusion which protrudes inwardly may be integrated with the plate-like member 710 and the emission side partitioning member 90 may be configured with the protrusion.

Modification Example 2 of Second Embodiment

Figure 9:
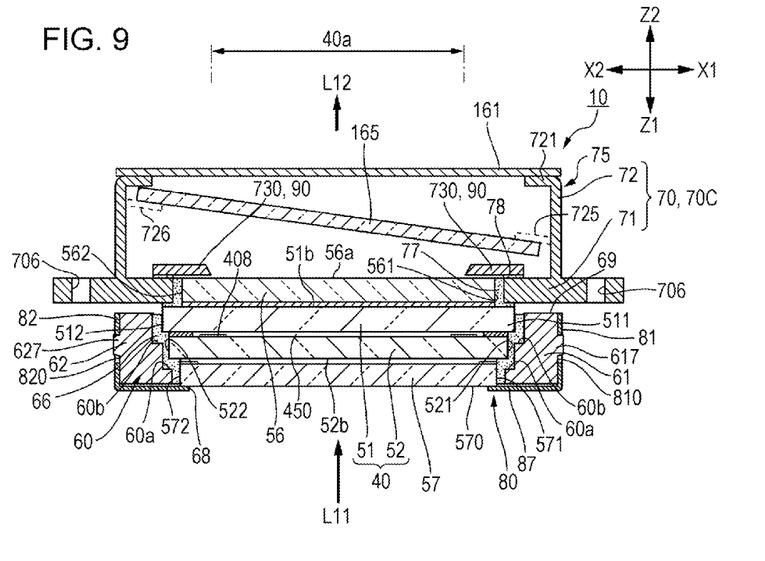
FIG. 9 is an XZ cross-sectional view of an electro-optic module according to Modification Example 2 of the second embodiment of the invention.

FIG. 9 is an XZ cross-sectional view of an electro-optic module 10 according to Modification Example 2 of the second embodiment of the invention. In the second embodiment, the plate portion 71 is configured with the plate-like member 710 and the body portion 72 is configured with the cylindrical member 720 in the second frame 70. However, in the embodiment, as illustrated in FIG. 9, the plate portion 71 and the body portion 72 are formed of an integrated frame member 70C. The frame member 70C is made of an iron-based metal material such as SPPC. In addition, since the plate portion 71 and the body portion 72 are made of the same metal material, the thermal expansion coefficients of the portions are the same. Accordingly, distortion does not easily occur even when the temperature changes.

In the second frame 70 having such a configuration, a frame-like partitioning member 730 is fixed to the plate portion 71 by an adhesive 78 and the partitioning member 730 protrudes inwardly from the second frame 70 and forms the emission side partitioning member 90 which covers the emission side light transmitting plate 56. Since configurations other than this configuration are the same as those of the first and second embodiments, description thereof will be omitted.

Other Embodiments of Electro-Optic Module

In the above-described embodiment, the structure in which the second frame 70 is fixed to the emission side light transmitting plate 56 by bonding, and the structure in which the second frame 70 is fixed to the emission side light transmitting plate 56 and the electro-optic panel 40 by bonding have been adopted. However, a structure in which the second frame 70 is fixed to the first frame 60 by bonding may be further adopted.

In the above-described embodiment, the electro-optic module 10 including the transmission type electro-optic panel 40 has been described, as an example. However, the invention may be applied to an electro-optic module 10 including a reflection type electro-optic panel 40. In the above-described embodiment, a front surface projection type display apparatus which projects an image from a direction in which a projected image is observed has been described as the projection type display apparatus, as an example. However, the invention may be applied to a projection type display apparatus used for a rear surface projection type display apparatus which projects an image from the opposite side of the direction in which the projected image is observed.

In the above-described embodiment, the liquid crystal panel has been described as an electro-optic panel, as an example. However, the invention is not limited thereto and the invention may be applied to an electro-optic module using an organic electroluminescent display panel, a plasma display panel, a field emission display (FED) panel, a surface-conduction electron-emitter display (SED) panel, a light emitting diode (LED) display panel, or an electrophoretic display panel, or the like.

Other Electronic Apparatuses

The electro-optic module to which the invention is applied may be used as a direct-view-type display apparatus in electronic apparatuses such as a mobile phone, a personal digital assistants (PDA), a digital camera, a liquid crystal television, a car navigation system, a video phone, a POS terminal, and a device including a touch panel in addition to the above-described electronic apparatus (projection-type display apparatus).

This application claims priority from Japanese Patent Application No. 2015-077456 filed in the Japanese Patent Office on Apr. 6, 2015, the entire disclosure of which is hereby incorporated by reference in its entirely.

What is claimed is:

1. An electro-optic module comprising: an electro-optic panel; an emission side light transmitting plate which is fixed to an image light emission side surface of the electro-optic panel and which covers a center of the electro-optic panel; a first frame which holds side surfaces of the electro-optic panel; a second frame which includes a frame-like emission side partitioning member that covers the emission side light transmitting plate from the opposite side of the electro-optic panel and is fixed to at least one of the electro-optic panel, the emission side light transmitting plate and the first frame; and an optical element which is held in the second frame, wherein at least one of an emission side polarizing plate and an emission side phase difference plate is held in the second frame as the optical element.

2. The electro-optic module according to claim 1, wherein the second frame includes a frame-like fixing member that is fixed to at least one of the electro-optic panel, the emission side light transmitting plate and the first frame, and the frame-like emission side partitioning member is integrated with the fixing member.

3. The electro-optic module according to claim 1, wherein the second frame includes a frame-like fixing member which is fixed to at least one of the electro-optic panel, the emission side light transmitting plate and the first frame, and a partitioning member that is formed separately from the frame-like fixing member and protrudes inwardly from the frame-like fixing member in a state of being fixed to the frame-like fixing member to form the frame-like emission side partitioning member.

4. An electronic apparatus comprising: the electro-optic module according to claim 3, a light source portion which emits light to be supplied to the electro-optic module; and a projection optical system which projects light modulated by the electro-optic module.

5. The electro-optic module according to claim 1, wherein the electro-optic panel includes a first substrate, a second translucent substrate which is arranged to face the first substrate at the emission side, and an electro-optic layer which is provided between the first substrate and the second substrate.

6. An electronic apparatus comprising: the electro-optic module according to claim 1, a light source portion which emits light to be supplied to the electro-optic module; and a projection optical system which projects light modulated by the electro-optic module.

7. An electronic apparatus comprising: the electro-optic module according to claim 2, a light source portion which emits light to be supplied to the electro-optic module; and a projection optical system which projects light modulated by the electro-optic module.

8. The electro-optic module according to claim 2, wherein the frame-like fixing member includes a frame-like plate portion which is fixed to at least one of the electro-optic panel, the emission side light transmitting plate and the first frame, and a cylindrical body portion which protrudes from the frame-like plate portion toward the opposite side of the first frame, and the optical element is held in the body portion.

9. The electro-optic module according to claim 8, wherein the second frame includes a plate-like member which forms the frame-like plate portion, and a cylindrical member which is provided separately from the plate-like member and protrudes from the plate-like member toward the opposite side of the first frame in a state of being fixed to the plate-like member to form the body portion.

10. The electro-optic module according to claim 8, wherein a thickness of the frame-like plate portion is thicker than a thickness of the body portion, and an attaching portion for an electronic apparatus on which the electro-optic panel is mounted is formed in the frame-like plate portion.

11. An electronic apparatus comprising: the electro-optic module according to claim 8, a light source portion which emits light to be supplied to the electro-optic module; and a projection optical system which projects light modulated by the electro-optic module.

12. The electro-optic module according to claim 8, wherein both the emission side polarizing plate and the emission side phase difference plate are held in the body portion as the optical element.

13. The electro-optic module according to claim 12, wherein the emission side polarizing plate is held in an end portion of the body portion on the opposite side of the frame-like plate portion, and the emission side phase difference plate is held between the emission side polarizing plate and the emission side light transmitting plate at an inner side of the body portion.

14. The electro-optic module according to claim 13, wherein the emission side phase difference plate is held at the inner side of the body portion at a posture inclined to the emission side polarizing plate.

15. An electronic apparatus comprising: the electro-optic module according to claim 12, a light source portion which emits light to be supplied to the electro-optic module; and a projection optical system which projects light modulated by the electro-optic module.

16. The electro-optic module according to claim 12, wherein the emission side phase difference plate is held at an end portion of the body portion on the opposite side of the frame-like plate portion, and the emission side polarizing plate is fixed to a surface of the emission side phase difference plate on the opposite side of the emission side light transmitting plate.

17. The electro-optic module according to claim 16, wherein the frame-like fixing member is fixed to a surface of the emission side light transmitting plate on the opposite side of the electro-optic panel in a state in which the frame-like fixing member is separated from the electro-optic panel and the first frame.

18. An electronic apparatus comprising: the electro-optic module according to claim 16, a light source portion which emits light to be supplied to the electro-optic module; and a projection optical system which projects light modulated by the electro-optic module.

* * * * *